March 13, 1973   J. E. GORGENS ET AL   3,720,234
DOUBLE SEATED REGULATING VALVE
Filed Feb. 24, 1971

INVENTORS:
JOSEPH E. GORGENS
ROBERT D. BISSELL

ATTORNEY

United States Patent Office 3,720,234
Patented Mar. 13, 1973

3,720,234
DOUBLE SEATED REGULATING VALVE
Joseph E. Gorgens, Trumbull, and Robert D. Bissell, Orange, Conn., assignors to Dresser Industries, Inc., Dallas, Tex.
Filed Feb. 24, 1971, Ser. No. 118,262
Int. Cl. F16k 1/44
U.S. Cl. 137—625.36       15 Claims

ABSTRACT OF THE DISCLOSURE

A double seated valve having an axially moveable tubular disc stem. The stem supports two pre-spaced closure discs opposite the respective valve seat with which each disc is to cooperate in the regulation of fluid flow. A coaxially mounted regulator operating rod extends from without the valve bonnet to a stem connection within the tube thereof. Radial clearance between the tube wall and rod for their coextensive length from the point of connection flexibly accommodates relative axial offset therebetween.

BACKGROUND OF THE INVENTION (1) The field of art to which the invention pertains comprises the art of "Fluid Handling" contained in Patent Office Class 137 as particularly directed to reciprocating valves.

(2) Regulating valves for modulating fluid flow in response to changes in a sensed condition such as temperature and/or pressure are widely used and are available from many commercial sources. The valves are either single or double seated usually as a function of flow capacity to be regulated and are operative by a powered regulator mounted externally of the valve bonnet. Typically, single seated valves are characterized as being capable of positive shutoff when required, whereas double seated valves characteristically are known to leak at valve shutoff to on the order of one percent or more of valve flow capacity. The latter problem has long been tolerated as inherently associated with the double seated valve and is attributed to the difficulty of obtaining perfectly coincident, simultaneous seating of two axially spaced, axially moveable closure discs against the valve seats with which they respectively cooperate.

Generally speaking, failure to achieve positive or near positive shutoff with double seated valves can be directly attributed to an inability to maintain tolerances both during manufacture and subsequent thereto. That is, in order to even minimize leakage, much less effect its elimination, tolerances must be closely maintained both during manufacture and under the post-manufacture field service conditions to which the valve is later subjected. This entails not only a manufactured axial spacing and alignment between discs being a near perfect match with their cooperating seats, but also a spacing and alignment not adversely affected by the temperature, pressure, etc. operating conditions for which valve use is contemplated.

As can be appreciated, maintaining extremely close manufacturing tolerances is very costly and when compounded by need for a critical materials selection having matched thermal properties and the like, these costs become commercially prohibitive. Consequently, a generally used approach to the problem has been to "float" the disc assembly from a top connection by use of a flexible joint. This has the purpose to enable self-centering between discs and seats whereby to minimize radial clearances. Whereas highly effective when new, the prior art effect of this approach has been to usually deteriorate with time as the flexible joint incurs vibration and wear in service.

SUMMARY OF THE INVENTION

This invention relates to a valve construction for a double seated regulator valve. More particularly, the invention relates to a double seat valve having a "floating" disc assembly which is increasingly flexible and not adversely subject to the same degree of deterioration from vibration and wear as has been associated with such similar purpose valves of the prior art. In accordance with the invention, this improved result is achieved by means of the valve discs being accurately spaced on a tubular valve stem extending in the flow passage between seats. A regulator operating rod from outward of the bonnet is freely received through the stem and internally connected thereto at or near the stem bottom, i.e. the stem end furthest removed from the valve bonnet. With this construction, relative flexibility is afforded between the rod and stem over their coextensive length such that a moment is produced about the seating surfaces tending to self align any misalignment between discs and seats during closure. Not only has this arrangement been found increasingly effective in reducing leakage at shutoff, but it likewise has been found to reduce required closing force while substantially if not completely overcoming the former flexible joint problem resulting from vibration and wear.

It is therefore an object of the invention to provide a novel construction for minimizing leakage in a double seated regulating valve.

It is a further object of the invention to improve the closure operating characteristics of a double seated regulating valve with a floating disc assembly having increased flexibility as to be less adversely subject to the effects of vibration and wear than are such similarly constructed valves of the prior art.

It is a further object of the invention to provide an improved double seated regulating valve as in the aforementioned objects which is readily adaptable to either direct acting or reverse acting operation.

It is a still further object of the invention to provide an improved double seated regulator valve as in the aforesaid objects which obtains improved operating performance without an economic sacrifice as to maintain its commercially competitive marketing position.

Figure 1:
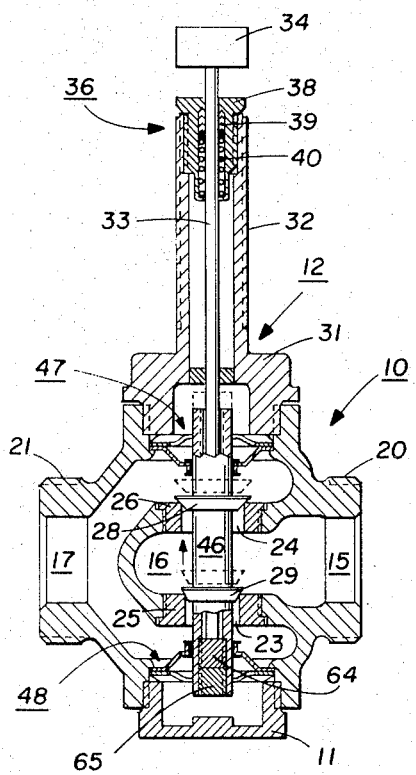
FIG. 1 is a section elevation of a double seated regulating valve incorporating the invention hereof for direct acting operation.

Referring initially to FIG. 1 of the drawings, there is shown in its shutoff relation to fluid flow a double seated regulating valve of a type with which the invention hereof is to be utilized. The valve comprises a main body 10 of cast bronze or the like to which at its underside is secured a hollowed annular cap 11 and at its topside is secured an elongated bonnet designated 12. It is to be understood that it is usual to install these valves with the stem axis vertical and bonnet up. Hence, reference herein to "top," "bottom," "upper," "lower," etc. is intended to be interpreted in that relation.

Body 10 conventionally includes a fluid inlet 15 communicating with a central passage 16 in turn communicating with a fluid outlet 17. Both the inlet and outlet ends of the body are threaded at 20 and 21 respectively for connecting the valve into the piping system with which it is to be utilized. Fluid flowing through the valve when in its open position will be received through inlet 15 to be divided at passage 16 between seat ports 23 and 24 of lower and upper annular seat rings 25 and 26 respectively before flowing outward through outlet 17. Adapted to open and close ports 23 and 24 to fluid flow are a pair of bevelled closure discs 28 and 29 as will be further described below.

Bonnet 12 is comprised of a body section 31 secured threaded to the upper end of main body 10 and from which it extends as an upstanding tubular section 32 enclosing a regulator operating rod 33 connected to a remote regulator assembly 34. The upper terminal end of tube section 32 affords a leak tight seal about reciprocably moveable rod 33 by means of a packing assembly 36 comprised of a threaded cage-like thimble 38 centrally containing a quantity of packing material 39 maintained constantly compacted by compressed coil spring 40.

Figure 2:
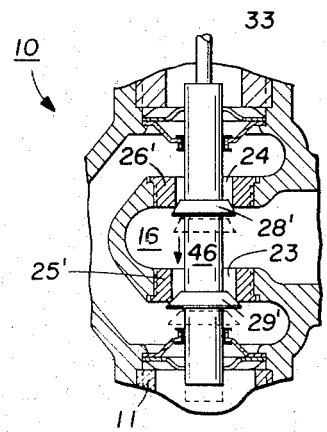
FIG. 2 is a fragmentary view similar to FIG. 1 but modified for effecting reverse acting operation.

Referring now also to FIG. 2 it is to be noted that it differs from the embodiment of FIG. 1 in the inverted relationship of valve discs 28' and 29' to their seat rings 25' and 26'. Being adapted for reverse valve acting operation as opposed to direct valve acting operation of FIG. 1, the discs are at the underside of ports 23 and 24 instead of topside. In this regard the terms "direct acting" and "reverse acting" are used in their conventional commercial sense. By way of example, when used for temperature regulation, flow is to increase for which the valve increasingly opens in "direct" operation in response to a condition-sensed temperature drop and vice versa. Contra, for "reverse" operation, a condition-sensed temperature drop produces a decrease in fluid flow. For both embodiments of FIGS. 1 and 2, the shutoff relation is illustrated solid and the open relation is illustrated dashed.

Figure 3:
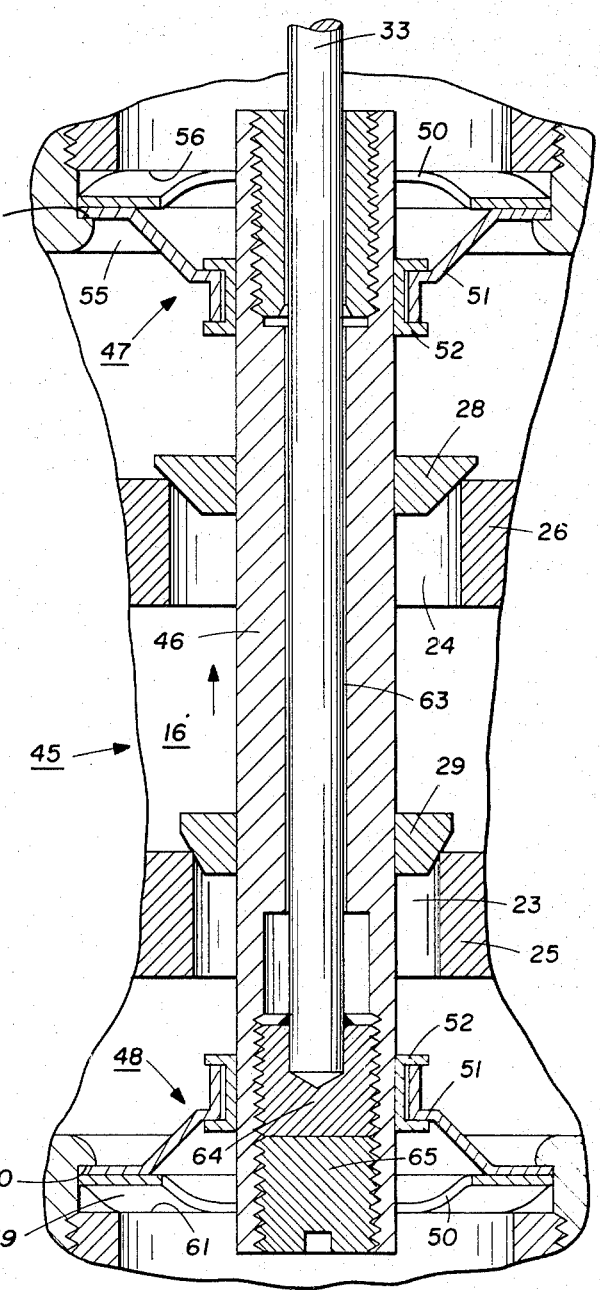
FIG. 3 is an enlarged section of the disc assembly construction in accordance herewith.

The invention will now be described with specific reference to FIG. 3 in which the disc assembly 45 in accordance herewith is most clearly shown. Disc assembly 45 is comprised of an elongated tubular stem 46 slidably supported and guided at its upper end by a bearing assembly 47 and at its lower end by a bearing assembly 48. Each bearing assembly in turn is comprised of a centrally open wave washer 50 compressed in annular engagement against the radial flange of a centrally open cup-guide support 51 to which is centrally staked a sleeve bushing 52. The bearing assemblies are each secured betwen main body 10 and its contiguous component of either cap 11 or bonnet 12 for the lower and upper bearings respectively. Bearing assembly 47 is secured sandwiched in a radial recess 55 formed between the bonnet underface 56 and main body shoulder 57. Similarly, bearing assembly 48 is secured sandwiched in a radial recess 59 between shoulder underface 60 of the main body and top end face 61 of cap 11.

Stem 46 supports discs 28 and 29 secured to its exterior as by brazing or welding in a closely matched spaced correspondence to the seating surface spacing between seats 25 and 26. Being supported for slidable movement between bearings 47 and 48, the stem extends coaxially through seat ports 23 and 24 in moving discs 28 and 29 from the valve closed relation shown solid to the valve open position shown dashed.

Movement of stem 46 between open and closed relation to a location corresponding to the flow rate relation required by remote regulator 34 is effected by axially positioned movement of operating rod 33. For this purpose rod 33 extends centrally through bonnet tube 32 from which it is received into the upper end of stem 46 to extend centrally downward. With rod 33 being of a smaller diameter in lateral section than the central tube portion of stem 46, there is provided an axially maintained radial clearance 63 therebetween. Termination of rod 33 is at or near the lower stem end whereat it is secured as by welding to a threaded plug 64 in turn threadably secured internally to the stem. Initial position setting of the discs relative to their seats in axial correspondence with the shutoff position of operating rod 33 can thereby be obtained by screwed axial adjustment of plug 64. A threaded set screw 65 received within the lower terminal end of stem 46 secures the axial relation therebetween. Thereafter, axial movement of operating rod 33 by regulator 34 effects a corresponding axial movement of stem 46 and closure discs 28 and 29 secured thereto. In order to obtain seating reliability in accordance with the invention, bearing assemblies 47 and 48 are permitted to float radially during manufacture assembly. This enables them to centralize themselves with respect to the axis of seats 25 and 26 in which relation they essentially remain from the imposed spring force afforded by each wave washer spring 50.

The length of operating rod 33 can of course vary to suit any particular need and for the valve being described is on the order of 8 to 9 inches as a function of valve size with which it is to be employed. For these same purposes the rod is of a relatively small cross-sectional diameter on the order of about 3/16 inch. By effectively securing the small diameter rod 33 at opposite ends while maintaining it free of lateral interference intermediate its ends, the rod is enabled to flex as required from a moment formed at its juncture with plug 64. In this manner any relative axial offset between rod 33 and stem 46 as would likely occur from radial displacement of the disc assembly during seating, is readily absorbed without distoring or forcing either closure disc away from its seating surface.

By the above description there has been disclosed a novel valve stem construction for double seated regulating valves whereby leakage associated with such valves in the prior art can be substantially minimized if not completely eliminated. In accordance herewith, a relatively simple disc stem construction insignificantly, if at all, adding to the economics of manufacture affords a reproducible highly reliable seating relation between the closure discs and their respective seating surfaces. A high degree of bending flexure afforded between operating rod 33 and disc stem 46 conveniently enables offset seating compensation for any radial displacement which may be encountered and at the same time is better able to endure the vibration and wear effects which deleteriously affected such valves in the prior art. By employing a common composition for body 10 and stem 46, such as bronze or the like having similar linear coefficients of thermal expansion, the initially set axial spacing between discs and seats is maintained and insured at various temperatures to which the valve might likely be exposed during service.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A regulating valve comprising:
 (a) a body defining a fluid passage between an inlet and an outlet;
 (b) a pair of spaced apart annular valve seats secured at a passage location intermediate said inlet and outlet, said valve seats being secured in said body in coaxial alignment with each other and each defining a central flow opening therethrough;
 (c) a disc stem extending through each of said seat openings and supported for axial movement relative thereto;
 (d) a pair of closure discs secured to said disc stem axially spaced apart a distance corresponding to the axial spacing of said valve seats and adapted to cooperate with said valve seats for regulating fluid flow through the openings thereof;
 (e) an elongated operating rod movably supported and extending between a first portion outward of said valve body for operative connection to a remote regulator and a second portion within said disc stem and radially spaced therefrom by a defined clearance throughout their entire coextensive length except at the rod end at which it is fixedly secured thereto; and
(f) connecting means securing said rod end to said stem whereby permitting relative freedom of axial offset movement in said clearance between said rod and stem in response to an incurred force axially removed from the connecting means and urging radial displacement between said rod and stem.

2. A regulating valve according to claim 1 in which at least one of said stem and rod are tubular and are superposed one within the other at the location of said connecting means.

3. A regulating valve according to claim 2 in which said disc stem is tubular for receiving the second portion of said rod and the internal tube diameter of said stem is greater than the external diameter of said rod to provide said clearance therebetween substantially over their coextensive length from said connecting means.

4. A regulating valve according to claim 3 including bearing means supporting said disc stem in the course of its axial movement.

5. A regulating valve according to claim 4 in which said bearing means comprises at least two bearings axially displaced from each other.

6. A regulating valve according to claim 3 in which said connecting means comprises a threaded plug fixedly secured to said second rod end and threadedly connected to said disc stem internally thereof.

7. A regulating valve according to claim 6 in which said disc stem has a sufficient axial length of internal thread at which to receive said plug for adjustably locating said stem axially in relative correspondence to the opening and closing stroke locations of said rod.

8. A regulating valve according to claim 3 in which said rod is received extending inward of said stem for a substantial length of said stem to said connecting means.

9. A regulating valve comprising:
(a) a body defining a fluid passage between an inlet and an outlet;
(b) a pair of spaced apart annular valve seats secured at a passage location intermediate said inlet and outlet, said valve seats being secured in said body in coaxail alignment with each other and each defining a central flow opening therethrough;
(c) a tubular stem extending through each of said seat openings and supported for axial movement relative thereto;
(d) a pair of closure discs secured to said stem axially spaced apart a distance corresponding to the axial spacing of said valve seats and adapted to cooperate with said valve seats for regulating fluid flow through the openings thereof; and
(e) an elongated operating rod movably supported and extending between a first portion outward of said valve body for operative connection to a remote regulator and a second portion within said disc stem and radially spaced therefrom by a defined clearance throughout their entire coextensive length except at the rod end at which it is fixedly secured thereto.

10. A regulator valve according to claim 9 in which said clearance between said rod and said stem accommodates relative axial offset between said rod and stem in response to an incurred force axially removed from the secured location and urging radial displacement between the said rod and stem.

11. A regulator valve according to claim 10 in which said rod is received extending inward of said stem for a substantial length of said stem to where secured thereto.

12. A regulating valve according to claim 11 including bearing means supporting said stem in the course of its axial movement.

13. A regulating valve according to claim 12 in which said bearing means comprises at least two bearings axially displaced from each other.

14. A regulating valve according to claim 11 including a threaded plug fixedly secured to said second rod end and threadedly connected to said stem internally thereof for securing said rod and stem together.

15. A regulating valve according to claim 14 in which said stem has a sufficient axial length of internal thread at which to receive said plug for adjustably locating said stem axially in relative correspondence to the opening and closing stroke locations of said rod.

References Cited
UNITED STATES PATENTS

| | | | |
|---|---|---|---|
| 894,897 | 8/1908 | Osborne | 137—625.34 |
| 1,911,785 | 5/1933 | Bailey | 137—625.36 X |
| 881,871 | 3/1908 | Rice | 137—625.36 X |
| 2,990,721 | 7/1961 | Spence | 137—625.36 X |
| 3,123,091 | 3/1964 | Elsey | 137—625.34 X |

FOREIGN PATENTS

| | | | |
|---|---|---|---|
| 1,156,474 | 12/1957 | France | 137—625.34 |

ARNOLD ROSENTHAL, Primary Examiner